(12) United States Patent
Grewe et al.

(10) Patent No.: US 9,481,374 B2
(45) Date of Patent: Nov. 1, 2016

(54) METHOD FOR A DRIVER ASSISTANCE APPLICATION

(71) Applicant: Conti Temic microelectronic GmbH, Nuremberg (DE)

(72) Inventors: Ralph Grewe, Frankfurt am Main (DE); Stefan Hegemann, Wangen (DE); Marc Fischer, Nonnenhorn (DE); Rolf Adomat, Eriskirch (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 14/646,153

(22) PCT Filed: Nov. 19, 2013

(86) PCT No.: PCT/DE2013/200307
§ 371 (c)(1),
(2) Date: May 20, 2015

(87) PCT Pub. No.: WO2014/079440
PCT Pub. Date: May 30, 2014

(65) Prior Publication Data
US 2015/0307110 A1    Oct. 29, 2015

(30) Foreign Application Priority Data

Nov. 20, 2012   (DE) .................. 10 2012 111 156
Dec. 7, 2012    (DE) .................. 10 2012 111 991

(51) Int. Cl.
*B60W 50/029*   (2012.01)
*B60W 50/00*    (2006.01)
*B60W 50/02*    (2012.01)

(52) U.S. Cl.
CPC .... *B60W 50/029* (2013.01); *B60W 2050/0006* (2013.01); *B60W 2050/0215* (2013.01); *B60W 2050/0292* (2013.01); *B60W 2550/00* (2013.01); *B60W 2550/10* (2013.01)

(58) Field of Classification Search
CPC ............ B60W 2050/0006; B60W 2050/0215; B60W 2050/0292; B60W 2550/00; B60W 2550/10; B60W 50/029
USPC ......................................................... 701/36
See application file for complete search history.

(56) References Cited

U.S. PATENT DOCUMENTS 5,458,404 A    10/1995   Fennel et al.
5,977,653 A *  11/1999   Schmid ............... B60R 16/0315
                                                    180/282

(Continued)

FOREIGN PATENT DOCUMENTS

DE    100 43 189      3/2001
EP    0 611 352       8/1994

(Continued)

OTHER PUBLICATIONS

International Search Report of the International Searching Authority for International Application PCT/DE2013/200307, mailed Mar. 4, 2014, 2 pages, European Patent Office, HV Rijswijk, Netherlands.

(Continued)

*Primary Examiner* — Thomas Tarcza
*Assistant Examiner* — Tyler J Lee
(74) *Attorney, Agent, or Firm* — W. F. Fasse

(57) ABSTRACT

A driver assistance system with improved fault tolerance and a method for the same are provided. An actuator control variable for a reduced driver assistance application with reduced functionality is a calculated in a second control unit in case of unavailability of an actuator control variable for the main driver assistance application with full functionality as determined by a first control unit.

19 Claims, 2 Drawing Sheets

(56) References Cited

U.S. PATENT DOCUMENTS

| | | | | |
|---|---|---|---|---|
| 6,109,239 | A * | 8/2000 | Watanabe | F02D 11/106 123/396 |
| 6,476,515 | B1 | 11/2002 | Yamamoto et al. | |
| 7,406,370 | B2 * | 7/2008 | Kojori | G05B 9/03 180/65.8 |
| 7,974,748 | B2 * | 7/2011 | Goerick | B60K 28/165 701/28 |
| 8,494,699 | B2 * | 7/2013 | Bourqui | B60L 3/0038 303/122.04 |
| 9,003,271 | B2 * | 4/2015 | Jung | B60W 50/0205 714/819 |
| 2007/0164168 | A1 * | 7/2007 | Hirvonen | B64C 13/04 244/223 |
| 2008/0054716 | A1 | 3/2008 | Sato et al. | |
| 2009/0044041 | A1 * | 2/2009 | Armbruster | H04L 12/40189 714/3 |
| 2011/0277460 | A1 * | 11/2011 | Brummund | B62D 5/091 60/484 |
| 2014/0108896 | A1 * | 4/2014 | Jung | B60W 50/0205 714/819 |

FOREIGN PATENT DOCUMENTS

| | | |
|---|---|---|
| EP | 1 227 007 | 7/2002 |
| EP | 1 616 746 | 1/2006 |
| WO | WO 2006/002695 | 1/2006 |

OTHER PUBLICATIONS

PCT International Preliminary Report on Patentability including English Translation of PCT Written Opinion of the International Searching Authority for International Application PCT/DE2013/200307, issued May 26, 2015, 9 pages, International Bureau of WIPO, Geneva, Switzerland.

German Search Report for German Patent Application No. 10 2012 111 991.0, dated Oct. 22, 2013, 5 pages, Muenchen, Germany, with English translation, 5 pages.

\* cited by examiner

METHOD FOR A DRIVER ASSISTANCE APPLICATION

FIELD OF THE INVENTION

The present invention relates to a driver assistance system and a method of operating it, with improved fault tolerance and redundancy.

BACKGROUND INFORMATION

Driver assistance systems such as active cruise control (ACC), overtaking assistant, lane departure warning systems, systems for traffic sign recognition or lighting control, and autonomous brake systems are components of modern vehicles.

In the systems that are currently approved, the driver is always part of the control loop, which means that the driver must remain attentive and intervene immediately if the driver assistance function fails. Such failure can be indicated, for example, by an alarm signal. In the future, it is planned to offer functionality for automated driving, i. e. the driver assistance system must be able to drive the vehicle safely for a predetermined period of time even in the event of a fault (such as a sensor failure). In this case, or if the driver does not immediately respond to a takeover request, at least a reduced driver assistance function must be available until the driver takes over or the driver assistance system is fully functional again.

SUMMARY OF THE INVENTION

In view of the above, it is an object of at least one embodiment of this invention to provide a driver assistance system with improved fault tolerance.

This object can be achieved according to at least one embodiment of a method and at least one embodiment of a driver assistance system according to the present invention, with features as set forth herein.

According to the invention, a method for a driver assistance system is provided. The driver assistance system includes at least one sensor unit (S1, S2, ... Sx) for detecting the surroundings, which may be designed as a radar, LIDAR and/or camera sensor. The driver assistance system further comprises a first central control unit (SE1) with means for calculating a surroundings model (5) at a high degree of precision. The surroundings model is based on the data from the at least one sensor unit, preferably a multitude of similar and/or different sensor units (S1, S2 ... Sx) is provided that have the same or different ranges of detection. Furthermore, the first central control unit is configured to calculate a control variable for a driver assistance application, such as a lane-keeping system, and for transmitting a first control signal (3) for an actuator control system (6), e. g. for the steering system of the vehicle, in accordance with the calculated control variable. A second control unit (SE2) is provided and includes means for calculating a second control variable based on data from the at least one sensor unit (S1, S2, ... Sx) for a reduced driver assistance application (RF, RF1, RF2) and for transmitting a second control signal (4, 4a, 4b) to the actuator control system (6). Furthermore, the driver assistance system includes an actuator with an actuator control unit. The second control unit is in particular a component of a sensor unit (S1, S2, ... Sx) or an actuator control unit.

In the event that the first control signal (3) is not available, the actuator is triggered
  using the second control signal (4, 4a, 4b), or
  a third control signal for triggering the actuator is calculated based on the last transmitted available value of the first control signal(s) (3) and on the second control signal (4, 4b), or
  the surroundings model calculated by the first control unit is transmitted to the second control unit (SE2) and a third control signal for a reduced driver assistance application is calculated based on said model. In particular, the transmitted surroundings model can be updated with current data from the at least one sensor unit (S1, S2, ... Sx).

In a preferred embodiment of the invention, fewer control cases are taken into account for calculating the second control variable (4, 4a, 4b) for the reduced driver assistance application (RF, RF1, RF2) as compared to calculating the control variable for use in the first control unit (SE1). In particular, control interventions are only performed if, for example, a collision is inevitable or the vehicle is at risk to depart from the lane.

It is preferred that no interventions are performed for comfort requests under the reduced driver assistance application (RF, RF1, RF2). Comfort requests include, for example, avoidance of abrupt transitions when controlling the longitudinal speed by limited acceleration or avoidance of fast, multiple changes between two control states, e. g. a swinging steering controller.

It is preferred that the calculation of a control variable for a reduced driver assistance application (4, 4a, 4b) is performed in an actuator control unit at least twice, using either data from different sensor units and/or different calculation methods (algorithms), and that a control signal for the actuator is calculated based on these at least two second control variables.

In a positive embodiment of the invention, the at least one sensor unit (S1, S2, ... Sx) includes means for preprocessing sensor data. In particular, preprocessing includes object or free space detection. After preprocessing, the sensor data is transmitted to the first control unit (SE1) and completely or partially to the second control unit (SE2).

It is preferred that object or free space information is calculated in a sensor unit according to a first method and a different second method (AL1, AL2, AL3, AL4) for preprocessing. The redundantly generated information is checked for plausibility for use in a surroundings model in the first control unit, and only information based on one of the two methods (e. g. AL1 and not AL2) is used in a second control unit (SE2) for a reduced driver assistance application (RF, RF1, RF2). In particular, one of the methods (AL1, AL4) is optimized for the reduced driver assistance application (RF, RF1, RF2).

In addition, an embodiment of a driver assistance system includes at least one sensor unit (S1, S2, ... Sx) for detecting the surroundings, e. g. a radar, LIDAR, and/or camera sensor system, and a first control unit (SE1) with means:
  for calculating a surroundings model (5) at a high degree of precision based on the data from the at least one sensor unit (S1, S2, ... Sx), and
  for calculating a control variable for a driver assistance application, and
  for transmitting a first control signal (3) in accordance with the calculated control variable.

A second control unit (SE2) is provided and includes means for calculating a second control variable based on data from the at least one sensor unit (S1, S2, ... Sx) for a reduced driver assistance application (RF, RF1, RF2) and for transmitting a second control signal (4, 4a, 4b) to the actuator control system (6). Furthermore, the driver assistance system includes an actuator with an actuator control unit. The second control unit may in particular be a component of one of the at least one sensor unit (S1, S2, ... Sx) or of the actuator control unit. The driver assistance system further includes means for calculating and transmitting a trigger signal for an actuator.

BRIEF DESCRIPTION OF THE DRAWINGS

The invention will be explained in more detail below with reference to exemplary embodiments and figures, wherein.

DETAILED DESCRIPTION OF EXAMPLE EMBODIMENTS OF THE INVENTION

Figure 1:
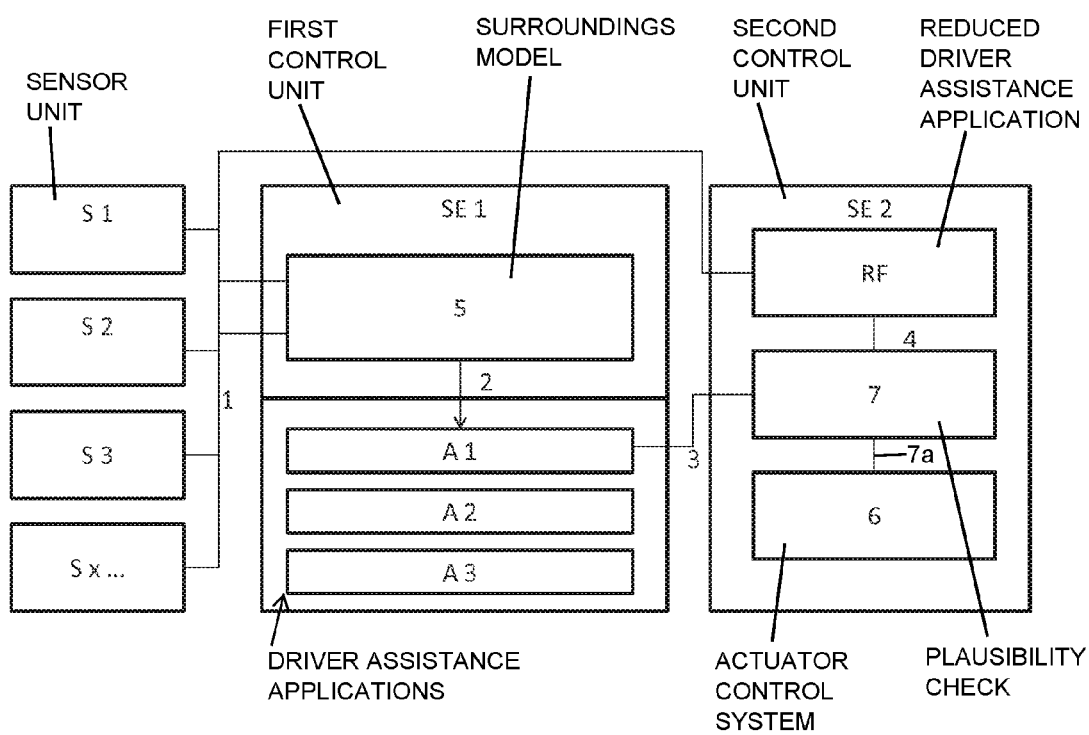
FIG. 1 is a schematic block diagram of a first example embodiment of a driver assistance system configured to perform a first example embodiment of a method according to the invention.

A preferred embodiment of the invention is shown in FIG. 1. Preprocessing is performed in the sensor units S1, S2, S3, Sx, for example, an object and/or a free space is detected. A free space is an area which the vehicle can currently drive into, e. g. a road section without obstacles. This data 1 is transmitted to a first control unit. The first control unit SE1 is the central control unit for driver assistance functions (ADAS-ECU) in this embodiment. The surroundings model 5, a high-resolution image of the vehicle surroundings, is calculated here using computing-intensive algorithms. The surroundings model may, for example, be designed as an occupancy grid in which merged object data from surrounding objects is stored by various sensor units. The data 2 of the surroundings model is made available to the driver assistance application A1, A2, Ax, which derives a control variable for a first control signal 3 for an actuator, e. g. for the brake, engine controller, and steering system, from it. The actuator has its own controller, which typically has a high ASIL level. Calculation of the surroundings model 5 and the driver assistance application A1, A2, Ax are optimized for high comfort, for which also an increased use of resources with respect to computing time is accepted.

To provide a redundant path without a second powerful and expensive controller, the sensor data 1 is also transmitted completely or partially to a second control unit SE2, which is embodied or incorporated in the control unit of the actuator in the present illustrated example embodiment. A reduced version of a driver assistance application RF is stored here, which derives a control variable for a second control signal 4 from it. The reduced driver assistance application RF is a minimal version of the driver assistance application, which calculates the second control variable for the second control signal 4 using resources efficiently and without taking comfort requirements into consideration. The first control signal 3 and the second control signal 4 are checked for plausibility 7 and taken into consideration for producing a third control signal 7a that is provided to the actuator control system 6. So, if the first control unit SE1 fails, there is still a second control variable and its associated second control signal 4 available, which can be used to bridge the period of time until the driver takes over or until the full functionality of the first control unit is restored. The limited comfort of the reduced driver assistance application, e. g. a swinging steering controller, can serve as an additional warning to the driver alerting him or her to take control of the vehicle.

Figure 2:
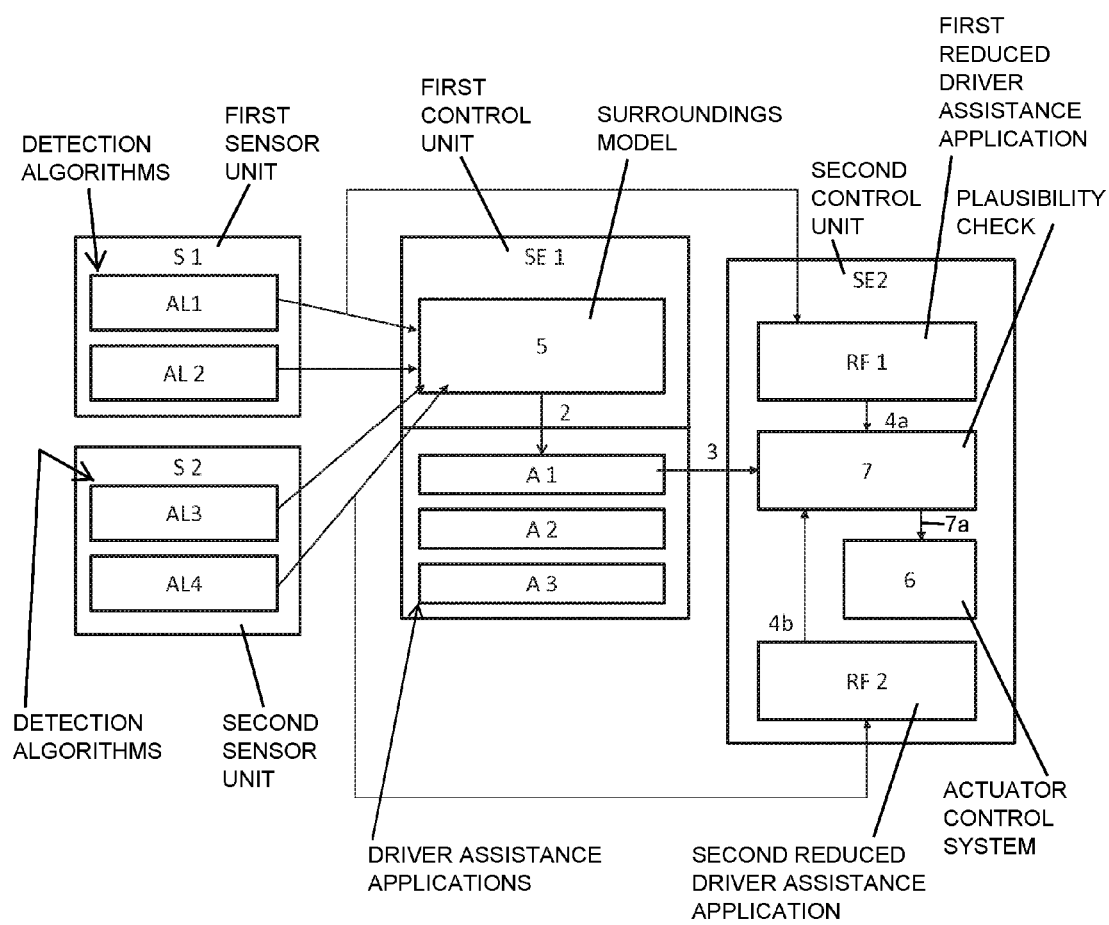
FIG. 2 is a schematic block diagram similar to FIG. 1 but regarding a second example embodiment.

In another embodiment, calculation of a multitude of reduced driver assistance applications is provided in the second control unit SE2. FIG. 2 shows an example of this case based on two reduced driver assistance applications RF1 and RF2 which respectively produce control variables for two second control signals 4a and 4b. These can be based on the data from a single sensor or on data from various sensors or on merged data from multiple sensor units. The transmitted control variables of second control signals 4a and 4b are checked for plausibility 7. If the control variables of the second control signals 4a and 4b cannot be checked for plausibility, each control variable of the signals 4a, 4b may for example be assigned a confidence value and the variable with the higher confidence value be selected for actuator control. The algorithms of the reduced driver assistance applications RF1 and RF 2 may preferably be different from one another and from the ones of the main application A1 of the first control unit to be able to detect systematic errors in the analysis of the sensor data.

In a further positive embodiment of the invention, the control variable of the first control signal 3 of the first control unit SE1 is further processed in the actuator for a plausibility check 7 or fault strategy to bridge a limited period of time after a failure of the first control unit SE1. In this way, another source of information is available for a limited period of time in combination with the control variable of the second control signal 4 of the reduced driver assistance application RF in FIG. 1 or the control variables of the second control signals 4a, 4b of the reduced driver assistance applications RF1, RF2 in FIG. 2, to produce a third control signal 7a that is provided to the actuator control system 6.

In a preferred embodiment of the invention, the surroundings model 5 is transmitted to the second control unit SE2 and stored for a predetermined time. If the first control unit SE1 fails, the stored data can still be used for a specific period of time with a reduced driver assistance functionality. The data provided directly by the sensor units S1, S2, S3, Sx can supplement this history and thus facilitate a somewhat longer bridging time.

It is preferred to have the sensor units run multiple different methods or algorithms AL1 and AL2 or AL3 and AL4, e. g. for free space detection, to exclude systematic errors caused by algorithms. FIG. 2. shows a schematic diagram of this process. The results of both methods or algorithms can be checked against each other for plausibility before they are merged. Furthermore, one of the sensor outputs can be particularly optimized for and additionally provided to a reduced driver assistance application RF1, RF2 in the second control unit SE2. In FIG. 2, these are the methods or algorithms AL 1 and AL 4. If AL2 and AL3 are used in the first control unit SE1 for the applications A1, A2, Ax, a completely different path to providing control inputs can be realized via the reduced driver assistance application RF. This path may be optimized for computing efficiency rather than for comfort to save costs for the overall system.

The invention claimed is:
1. A method for a driver assistance system, said method comprising:
with at least one sensor unit, detecting surroundings and producing corresponding sensor data;
with a first control unit, calculating a surroundings model based on the sensor data, calculating a first control variable for a first driver assistance application, and transmitting a first control signal in accordance with the first control variable;

with a second control unit, calculating a second control variable for a reduced second driver assistance application and a second control signal based on the sensor data;

with the second control unit, determining a third control signal when a current value of the first control signal is not available, wherein a value of the second control signal is used for the third control signal, or the third control signal is calculated based on the second control signal and a last transmitted value of the first control signal, or the surroundings model is transmitted to the second control unit and the third control signal is calculated based on the surroundings model; and actuating an actuator of the driver assistance system dependent on the first control signal when the current value of the first control signal is available, and actuating the actuator dependent on the third control signal when the current value of the first control signal is not available.

2. The method according to claim 1, characterized in that less computing time is needed for the calculating of the second control variable for the reduced second driver assistance application by the second control unit as compared to the calculating of the first control variable for the first driver assistance application by the first control unit because fewer control cases are considered in the reduced second driver assistance application than in the first driver assistance application.

3. The method according to claim 2, characterized in that the reduced second driver assistance application does not include any comfort requirements.

4. The method according to claim 1, characterized in that the calculating of the second control variable for the reduced second driver assistance application is performed at least twice, using respective data from different sensor units among the at least one sensor unit and/or using different calculation algorithms to respectively produce two of said second control variables, and wherein the calculating of the second control signal is based on the two second control variables.

5. The method according to claim 1, characterized in that the at least one sensor unit comprises a processor configured to perform preprocessing of the sensor data, wherein the preprocessing includes object and free space detection, and wherein the sensor data is transmitted to the first control unit and the second control unit after the preprocessing.

6. The method according to claim 5, characterized in that the preprocessing comprises calculating object or free space information twice respectively in accordance with a first algorithm and a different second algorithm to respectively produce redundant first and second informations, then checking the redundant first and second informations for plausibility for use by the first control unit, and then further processing and using only one of the first information or the second information for the actuating of the actuator.

7. A driver assistance system for performing the method according to claim 1, comprising:

the at least one sensor unit configured to perform the detecting of the surroundings;

the first control unit configured to perform the calculating of the surroundings model, and to perform the calculating of the first control variable, and to perform the transmitting of the first control signal;

the actuator and an actuator control unit configured to perform the actuating of the actuator; and the second control unit configured to perform the calculating of the second control variable and the second control signal, and to perform the determining of the third control signal, wherein the second control unit is disposed in the sensor unit or in the actuator control unit.

8. A method of operating a driver assistance system of a vehicle including at least one sensor unit, a first control unit, an actuator, and a second control unit, wherein the method comprises:

with the at least one sensor unit, detecting surroundings of the vehicle and producing corresponding sensor data;

with the first control unit, attempting to calculate a surroundings model based on the sensor data, attempting to calculate a first control variable for a first driver assistance application based on the surroundings model when the surroundings model is available, and attempting to produce a first control signal dependent on and in accordance with the first control variable when the first control variable is available;

with the second control unit, based on at least some of the sensor data calculating a second control variable for a second driver assistance application having reduced functionality compared to the first driver assistance application, and producing a second control signal dependent on and in accordance with the second control variable;

when the first control signal is not available, then with the second control unit producing a third control signal, wherein the producing of the third control signal comprises a first feature of using a value of the second control signal for the third control signal, or a second feature of calculating the third control signal based on the second control signal and a last transmitted value of the first control signal, or a third feature of providing the surroundings model from the first control unit to the second control unit and calculating the third control signal based on the surroundings model; and actuating the actuator dependent on the first control signal when the first control signal is available, and actuating the actuator dependent on the third control signal when the first control signal is not available.

9. The method according to claim 8, wherein less computing time is needed for calculating the second control variable for the second driver assistance application than for calculating the first control variable for the first driver assistance application because fewer control cases are considered in the second driver assistance application than in the first driver assistance application.

10. The method according to claim 8, wherein the second driver assistance application does not include any driver comfort requirements and the first driver assistance application includes at least one driver comfort requirement.

11. The method according to claim 8, wherein the at least one sensor unit includes at least two different sensor units that are different from one another, wherein the second control unit comprises or is incorporated in an actuator control unit of the driver assistance system, wherein the calculating of the second control variable for the second driver assistance application is performed in the actuator control unit at least twice to produce at least two of the second control variables respectively using the respective sensor data from the at least two different sensor units and/or using at least two different calculation algorithms, and wherein the second control signal is calculated based on the at least two second control variables.

12. The method according to claim 8, wherein the at least one sensor unit includes a processor configured to preprocess the sensor data, wherein the method further comprises preprocessing the sensor data including performing object detection and free space detection of the sensor data in the processor, and wherein the sensor data is transmitted to the first control unit and to the second control unit after the preprocessing thereof.

13. The method according to claim 12, wherein the preprocessing comprises calculating object or free space information of the sensor data a first time in accordance with a first calculation method to produce a first preprocessing result and a second time in accordance with a second calculation method different from the first calculation method to produce a second preprocessing result, and the preprocessing further comprises comparing the first and second preprocessing results to one another to check for plausibility thereof and produce a plausibilized result which is provided as the sensor data to the first control unit, and wherein only either the first preprocessing result or the second preprocessing result is provided to the second control unit.

14. The method according to claim 8, wherein the producing of the third control signal comprises the first feature.

15. The method according to claim 8, wherein the producing of the third control signal comprises the second feature.

16. The method according to claim 8, wherein the producing of the third control signal comprises the third feature.

17. A driver assistance system for a vehicle, comprising:
an actuator configured and arranged to actuate a control component of the vehicle;
an actuator control unit configured and arranged to provide actuating commands to the actuator;
at least one sensor unit configured and arranged to detect surroundings of the vehicle and to produce corresponding sensor data;
a first control unit configured and arranged to calculate a surroundings model based on the sensor data, to calculate a first control variable for a first driver assistance application based on the surroundings model, and to produce a first control signal dependent on and in accordance with the first control variable; and
a second control unit that is configured and arranged to calculate, based on at least some of the sensor data, a second control variable for a second driver assistance application having reduced functionality compared to the first driver assistance application, and to produce a second control signal dependent on and in accordance with the second control variable;
wherein the second control unit is further configured and arranged to produce a third control signal and to provide the third control signal to the actuator control unit when a current value of the first control signal is not available, wherein a value of the second control signal is used for the third control signal, or the third control signal is calculated based on the second control signal and a last available value of the first control signal, or the surroundings model is provided from the first control unit to the second control unit and the third control signal is calculated based on the surroundings model.

18. The driver assistance system according to claim 17, wherein the second control unit is incorporated in the at least one sensor unit.

19. The driver assistance system according to claim 17, wherein the second control unit is incorporated in the actuator control unit.

* * * * *